United States Patent
Liu et al.

(10) Patent No.: US 11,890,788 B2
(45) Date of Patent: Feb. 6, 2024

(54) METHODS AND PROCESS FOR PRODUCING POLYMER-METAL HYBRID COMPONENTS BONDED BY C—O-M BONDS

(71) Applicant: THE REGENTS OF THE UNIVERSITY OF MICHIGAN, Ann Arbor, MI (US)

(72) Inventors: Fengchao Liu, Ann Arbor, MI (US); Pingsha Dong, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/323,647

(22) Filed: May 18, 2021

(65) Prior Publication Data
US 2021/0362380 A1    Nov. 25, 2021

Related U.S. Application Data

(60) Provisional application No. 63/027,456, filed on May 20, 2020.

(51) Int. Cl.
*B29C 43/18*    (2006.01)
*B29C 65/64*    (2006.01)
(Continued)

(52) U.S. Cl.
CPC ............ *B29C 43/183* (2013.01); *B29C 43/34* (2013.01); *B29C 43/46* (2013.01); *B29C 65/64* (2013.01);
(Continued)

(58) Field of Classification Search
None
See application file for complete search history.

(56) References Cited

U.S. PATENT DOCUMENTS

| | | | |
|---|---|---|---|
| 4,411,952 A | 10/1983 | Sasaki et al. | |
| 4,732,312 A | 3/1988 | Kennedy et al. | |

(Continued)

FOREIGN PATENT DOCUMENTS

| | | | |
|---|---|---|---|
| CN | 106623936 A | | 5/2017 |
| CN | 206520145 U | * | 9/2017 |

(Continued)

OTHER PUBLICATIONS

Machine English translation of JP6315017, Accessed Jun. 14, 2022 (Year: 2017).*

(Continued)

*Primary Examiner* — Jacob T Minskey
*Assistant Examiner* — Adrianna N Konves
(74) *Attorney, Agent, or Firm* — Harness, Dickey & Pierce, P.L.C.

(57) ABSTRACT

Methods of producing polymer-metal hybrid components that are bonded by C—O-M bonds at the interface using at least one of the hot pressing, rolling, and injection molding methods to create chemical bond formation conditions at the polymer and metal interface. When the thermal cycle and compressive pressure specified herein is combinationally created at the polymer and metal interfaced, strong C—O-M bonds forms at the interface and strongly bonds the metal and polymer together through the reaction carbonyl groups (C=O) in polymer and the metal surface. For polymers lacking enough carbonyl groups, new functional groups can be in-situ generation through introducing distributed air pockets at the polymer-metal interface for forming 3-dimensional distributed C—O-M bonds at the interface.

16 Claims, 19 Drawing Sheets

(51) Int. Cl.
    *B29C 65/00*           (2006.01)
    *B29C 43/46*           (2006.01)
    *B29C 43/34*           (2006.01)
    *B29C 43/14*           (2006.01)
(52) U.S. Cl.
    CPC ............ *B29C 66/022* (2013.01); *B29C 66/72* (2013.01); *B29C 66/742* (2013.01); *B29C 43/146* (2013.01)

(56) References Cited

U.S. PATENT DOCUMENTS

| | | | |
|---|---|---|---|
| 5,262,123 | A | 11/1993 | Thomas et al. |
| 6,676,008 | B1 | 1/2004 | Trapp et al. |
| 7,096,705 | B2 | 8/2006 | Segal |
| 8,114,474 | B1 | 2/2012 | Dudt et al. |
| 8,397,974 | B2 | 3/2013 | Schultz et al. |
| 8,632,850 | B2 | 1/2014 | Schultz et al. |
| 8,636,194 | B2 | 1/2014 | Schultz et al. |
| 8,875,976 | B2 | 11/2014 | Schultz et al. |
| 8,893,954 | B2 | 11/2014 | Schultz et al. |
| 9,205,578 | B2 | 12/2015 | Schultz et al. |
| 9,266,191 | B2 | 2/2016 | Kandasamy et al. |
| 9,511,445 | B2 | 12/2016 | Kandasamy |
| 9,511,446 | B2 | 12/2016 | Kandasamy et al. |
| 9,527,230 | B2 | 12/2016 | Takeuchi et al. |
| 9,555,580 | B1 | 1/2017 | Dykstra et al. |
| 9,643,279 | B2 | 5/2017 | Schultz et al. |
| 9,862,054 | B2 | 1/2018 | Kandasamy et al. |
| 9,943,929 | B2 | 4/2018 | Schultz et al. |
| 10,105,790 | B2 | 10/2018 | Kandasamy |
| 10,189,063 | B2 | 1/2019 | Lavender et al. |
| 10,500,674 | B2 | 12/2019 | Kandasamy et al. |
| 10,583,631 | B2 | 3/2020 | Kandasamy et al. |
| 11,311,959 | B2 | 4/2022 | Hardwick et al. |
| 2001/0011177 | A1 | 8/2001 | Peterson |
| 2002/0158109 | A1 | 10/2002 | Gendoh et al. |
| 2002/0190100 | A1 | 12/2002 | Duncan, Jr. |
| 2003/0192939 | A1 | 10/2003 | Mishra |
| 2004/0057782 | A1 | 3/2004 | Okamoto et al. |
| 2005/0081594 | A1 | 4/2005 | Segal |
| 2005/0121497 | A1 | 6/2005 | Fuller et al. |
| 2007/0040006 | A1 | 2/2007 | Charles et al. |
| 2008/0029581 | A1 | 2/2008 | Kumagai et al. |
| 2008/0041921 | A1 | 2/2008 | Creehan et al. |
| 2008/0236720 | A1 | 10/2008 | Sigler et al. |
| 2009/0140027 | A1 | 6/2009 | Badarinarayan et al. |
| 2011/0104515 | A1 | 5/2011 | Kou et al. |
| 2011/0309131 | A1 | 12/2011 | Hovanski et al. |
| 2012/0279441 | A1 | 11/2012 | Creehan et al. |
| 2014/0064830 | A1 | 3/2014 | Nagano et al. |
| 2014/0367452 | A1 | 12/2014 | Dinda et al. |
| 2015/0075242 | A1 | 3/2015 | Eller et al. |
| 2016/0175981 | A1 | 6/2016 | Kandasamy |
| 2016/0361868 | A1 | 12/2016 | Wang |
| 2017/0008121 | A1 | 1/2017 | Li |
| 2017/0043429 | A1 | 2/2017 | Kandasamy |
| 2017/0151766 | A1* | 6/2017 | Wang ................ B32B 37/0053 |
| 2018/0022038 | A1 | 1/2018 | Zhang et al. |
| 2018/0050418 | A1 | 2/2018 | Dong et al. |
| 2018/0050419 | A1 | 2/2018 | Das et al. |
| 2018/0073532 | A1 | 3/2018 | Whalen et al. |
| 2018/0178455 | A1 | 6/2018 | Washika et al. |
| 2018/0311713 | A1 | 11/2018 | Joshi et al. |
| 2019/0054672 | A1 | 2/2019 | Kajihara et al. |
| 2019/0134864 | A1 | 5/2019 | Park et al. |
| 2019/0283173 | A1 | 9/2019 | Grong et al. |
| 2019/0375148 | A1 | 12/2019 | Susnjara et al. |
| 2020/0016687 | A1 | 1/2020 | Whalen et al. |
| 2020/0262173 | A1* | 8/2020 | Jung .................... B23K 26/361 |
| 2020/0306869 | A1 | 10/2020 | Hardwick et al. |
| 2020/0306874 | A1 | 10/2020 | Tsuta et al. |
| 2020/0306876 | A1 | 10/2020 | Tsuta et al. |
| 2021/0078258 | A1 | 3/2021 | Lalande et al. |
| 2021/0197457 | A1 | 7/2021 | Broach et al. |
| 2021/0245293 | A1 | 8/2021 | Hardwick et al. |
| 2021/0308937 | A1 | 10/2021 | Broach et al. |
| 2021/0362380 | A1 | 11/2021 | Liu et al. |
| 2022/0080522 | A1 | 3/2022 | Cox et al. |
| 2022/0176633 | A1 | 6/2022 | Hardwick et al. |

FOREIGN PATENT DOCUMENTS

| | | |
|---|---|---|
| CN | 111745287 A | 10/2020 |
| CN | 111941962 A | 11/2020 |
| CN | 112123789 A | 12/2020 |
| EP | 1844890 A1 | 10/2007 |
| EP | 2777837 A1 | 9/2014 |
| JP | S63164450 A | 7/1988 |
| JP | H0289520 A | 3/1990 |
| JP | H07256482 A | 10/1995 |
| JP | 2000153374 A | 6/2000 |
| JP | 2001071155 A | 3/2001 |
| JP | 2003275876 A | 9/2003 |
| JP | 2009090359 A | 4/2009 |
| JP | 6353931 B2 | 11/2013 |
| JP | 6315017 B2 | 4/2018 |
| KR | 101316989 B1 | 10/2013 |
| WO | 2012005722 A1 | 1/2012 |
| WO | 2016199100 A1 | 12/2016 |
| WO | 2017194793 A1 | 11/2017 |
| WO | 2019199100 A1 | 10/2019 |

OTHER PUBLICATIONS

Machine English translation of CN206520145U, Accessed Jun. 14, 2022 (Year: 2017).*
Francesco Lambiase et al. "Friction assisted joining of aluminum and PVC." Journal of Manufacturing Processes 29 (2017) 221-231.
F.C. Liu et al. "On formation of Al—O—C bonds at aluminum/polyamide joint interface." Applied surface Science 466 (2019) 202-209.
F.C. Liu et al. "A high-speed metal-to-polymer direct joining technique and underlying bonding mechanisms." Journal of Materials Processing Tech. 280 (2020) 116610.
S.C. Han et al. "Achieving a strong polypropylene/aluminum alloy friction spot joint via a surface laser processing pretreatment." Materials Science & Technology (2020).
International Search Report and Written Opinion regarding International Application No. PCT/US2021/033070, dated Sep. 9, 2021.
Hussein et al. On Amorphous Phase Formation in Dissimilar Friction Stir Welding of Aluminum to Steel, Journal of Engineering and Applied Sciences, Apr. 2017, vol. 12, No. 7, pp. 69-81.
International Search Report and Written Opinion dated Apr. 2, 2021 in PCT Application No. PCT/US2020/066613.
Liu et al. "Alloy amorphization through nanoscale shear localization at Al—Fe interface", Materials Today Physics vol. 15, Dec. 2020, (Year: 2020).
Liu et al., "From thick intermetallic to nanoscale amorphous phase at Al—Fe joint interface: roles of friction stir welding conditions", Scripta Materialia, vol. 191, Jan. 15, 2021, pp. 167-172 (Year: 2021).
International Search Report and Written Opinion of International Application No. PCT/US2020/042847 dated Oct. 30, 2020.
Forging. (1992). In C. G. Morris (Ed.), Academic Press Dictionary of Science and Technology (4th ed.). Elsevier Science & Technology. Credo Reference: https://search .credoreference.com/content/entry/apdst/forging/0?institutionld=7 43 (Year: 1992).
Forging. (2008). In Philip's encyclopedia. Philip's. Credo Reference: https://search.credoreference.com/content/entry/ philipency/forging/0?institutionld=743 (Year: 2008).
Ho. P.S. et al. "Chemical bonding and reaction at metal/polymer interface." Journal of Vacuum Science & Technology A, 1985, vol. 3, pp. 739-745.
International Search Report and Written Opinion dated Aug. 11, 2020 in International Application No. PCT/US2020/029880.
Extended European Search Report regarding Patent Application No. 20808972.2, dated Jul. 13, 2023.

(56) References Cited

OTHER PUBLICATIONS

Kondoh Katsuyoshi et al: "CO bond enhancing direct bonding strength between plastic and pure titanium", Materials Letters, vol. 211, Oct. 16, 2017 (Oct. 16, 2017), pp. 331-334, XP085274161, ISSN: 0167-577X, DOI: 10.1016/J.MATLET.2017.10.042.
Ogura et al., "Partitioning evaluation of mechanical properties and the interfacial microstructure in a friction stir welded aluminum alloy/stainless steel lap joint", Scripta Materialia, vol. 66, Issue 8, 2012, pp. 531-534, (Year: 2012).
Tanaka et al. "Dissimilar joining of aluminum alloy and steel sheets by friction stir spot welding*", Journal of Japan Institute of Light Metals, vol. 56, No. 6 (2006), pp. 317-322 (Year: 2006).
Liu Fengchao et al.: "3D printing of find-grained aluminum alloys through extrusion-based additive manufacturing: Microstructure and property characterization", Journal of Materials Science & Technology, Allertion Press, Amsterdam, NL, vol. 139, Sep. 24, 2022 (Sep. 24, 2022), pp. 126-136.
Tuncer Nihan et al.: "Solid-State Metal Additive Manufacturing: A Review", JOM: Journal of Metals, Springer New York LLC, United States, vol. 72, No. 9, Jul. 9, 2020 (Jul. 9, 2020), pp. 3090-3111.
Extended European Search Report regarding Patent Application No. 20854637.4, dated Aug. 18, 2023.

* cited by examiner

METHODS AND PROCESS FOR PRODUCING POLYMER-METAL HYBRID COMPONENTS BONDED BY C—O-M BONDS

CROSS-REFERENCE TO RELATED APPLICATIONS

This application claims the benefit of U.S. Provisional Application No. 63/027,456, filed on May 20, 2020. The entire disclosure of the above application is incorporated herein by reference.

FIELD

The present disclosure relates to polymer/metal direct bonding enabled by the formation of C—O-M bonds the bonding interface using hot compression, rolling, or injection molding to create the bonds formation condition.

BACKGROUND AND SUMMARY

This section provides background information related to the present disclosure which is not necessarily prior art. This section provides a general summary of the disclosure, and is not a comprehensive disclosure of its full scope or all of its features.

High quality polymer-metal hybrid structures are in urgent need for minimizing weight in airframes, auto-bodies, and marine structures. Previously, bonding of polymer and metal has relied on mechanical interlocking or adhesive or a combination of both. However, bonding solely by mechanical interlocking cannot ensure the hermetic sealing and often results in interfacial contamination. Although adhesive bonding can achieve hermetic sealing, it requires a long curing time.

However, the present teachings provide manufacturing methods for producing polymer-metal hybrid components that are bonded by C—O-M bonds at the interface. The hybrid structures produced by the present teachings are characterized by a combination of low cost-effectiveness and high performance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
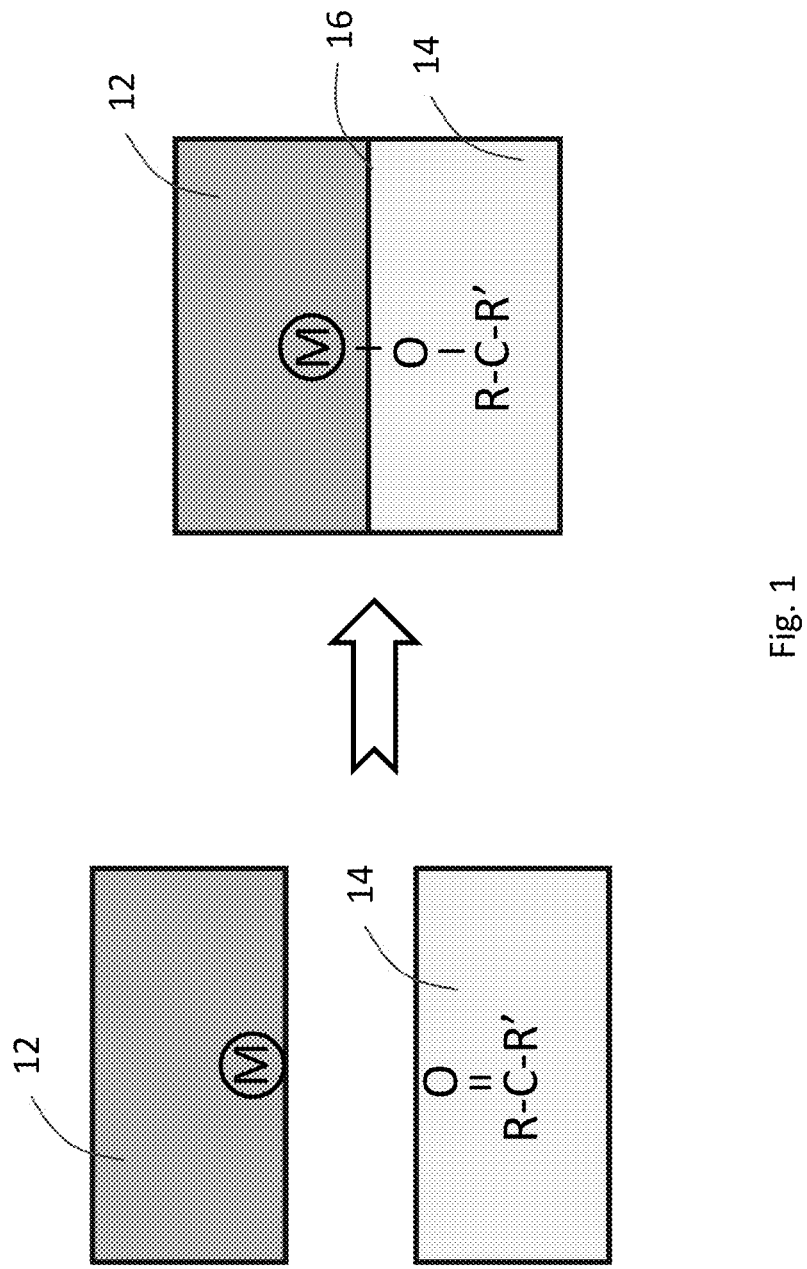
FIG. 1 illustrates schematic principles of the formation of a C—O-M bond between a carbonyl group within a polymer and an atom in a metal.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

"Metal" as used herein includes pure metal, alloys, and metal matrix composites.

"Polymer" as used herein includes polymer and polymer composites.

A recent scientific breakthrough according to the principles of the present teachings provides chemical bonds "C—O-M" developed at the polymer-metal interface under certain conditions (where "M" represents an element in the metal to be joined). As illustrated in FIG. 1, a metal 12 and a polymer 14 can be joined along a joint interface 16 via a chemical bond "C—O-M.". It should be understood that in order to develop a C—O-M bond, a polymer surface should contain sufficient carbonyl groups (C=O) as these C=O groups will transfer to C—O-M groups when they meet M atoms in the metal surface under bonding condition.

Figure 2:
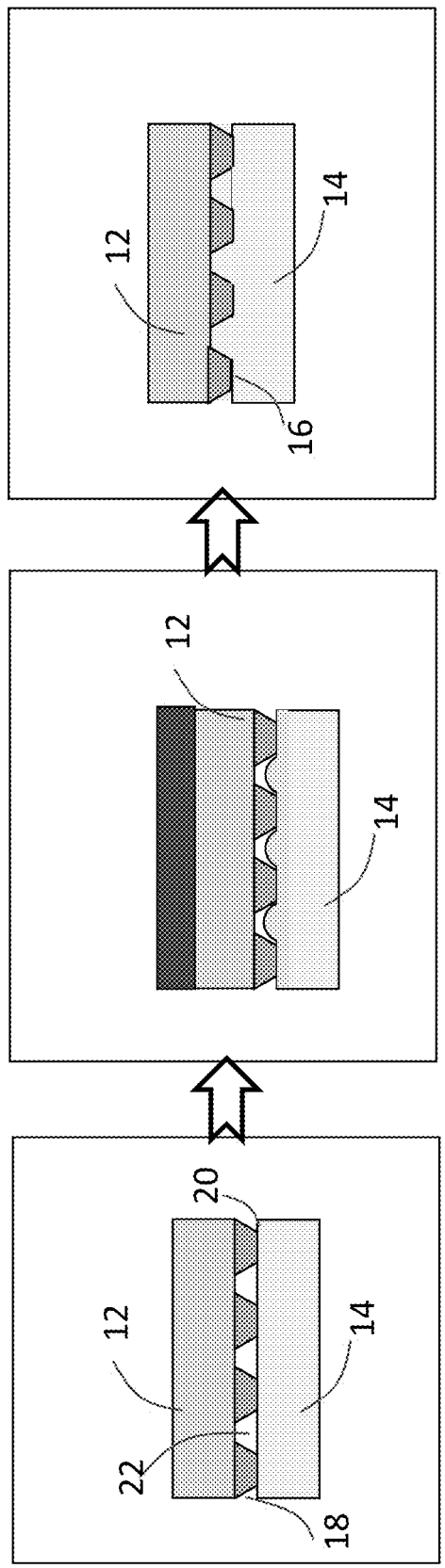
FIG. 2 illustrates schematic principles of the formation of three-dimensional (3D) C—O-M bonds between a polymer and a metal with the assistant of distributed air pockets.

For many polymers that do not contain sufficient C=O groups, additional functional groups can be added in between the polymer 14 and metal 12. In some embodiments, additional functional groups can be added through adding a polymer containing functional groups in between the polymer 14 and metal 12, under the applied temperature and compressive pressure, the polymer containing functional groups can be bonded to metal 12 though the formation of C—O-M bonds at their interface while the polymer containing functional groups can also be bonded to polymer 14. In some embodiments the polymer containing functional groups comprises the polymer containing C=O groups. In some embodiments, as illustrated in FIG. 2, distributed air pockets 18 can be added in between the polymer 14 and metal 12 to in-situ form new functional groups though the reaction of the surface 20 of the polymer 14 and the trapped air 22 within the air pockets 18. The intermediate state of the new functional groups on the polymer surface will transfer to C—O-M bonds. These distributed air pockets 18 can comprise a three-dimensional shape, and thus the resultant bond is termed a three-dimensional (3D) chemical bond or 3D C—O-M bond herein. In some embodiments, polymers 14 can be added that contain C=O groups at the polymer and metal interface 16.

According to some embodiments of the present teachings, a method of producing polymer-metal hybrid components that are bonded by C—O-M bonds at the interface comprises the following steps:

Step 1: optionally overlapping at least one of the metals and the polymer containing carbonyl groups (C=O);

Step 2: applying compressive pressure to the joint interface of the metal and the polymer via a compressive pressure applicator system 110 applying a compressive force F, the applied compressive pressure being higher than the flow resistance of the softened polymer at the interface;

Step 3: maintaining the temperature above a glass transition temperature of the polymer and compressive pressure at the bonding interface to generate intimate atomic contact between the metal and the polymer to create substantially C—O-M chemical bonds along the joint interface, the C—O-M chemical bonds being formed from carbonyl group (C=O) within the polymer Step 4: reducing the interfacial temperature below the polymer melting temperature before 5% of the polymer has pyrolyzed to avoid serious breaking of the C—O-M chemical bonds According to the principles of the present teachings, a hot-pressing method of producing polymer-metal hybrid components that are bonded by C—O-M bonds at the interface comprises the following steps in some embodiments:

Step 1: Adding distributed air pockets or polymer containing functional groups at the interface between the metal and polymer to be bonded;

Step 2: applying compressive pressure to the joint interface of the metal and the polymer, the applied compressive pressure being higher than the flow resistance of the softened polymer at the interface;

Step 3: maintaining the polymer metal interfacial temperature higher than the glass transition temperature of the polymer and maintaining the compressive pressure at the polymer metal interface higher than the flow resistance of the softened polymer to generate intimate atomic contact between the metal and the polymer to create C—O-M chemical bonds along the joint interface.

Step 4: reducing the interfacial temperature below the polymer melting temperature before 5% of the polymer has pyrolyzed to avoid serious breaking of the C—O-M chemical bonds.

Figure 3:
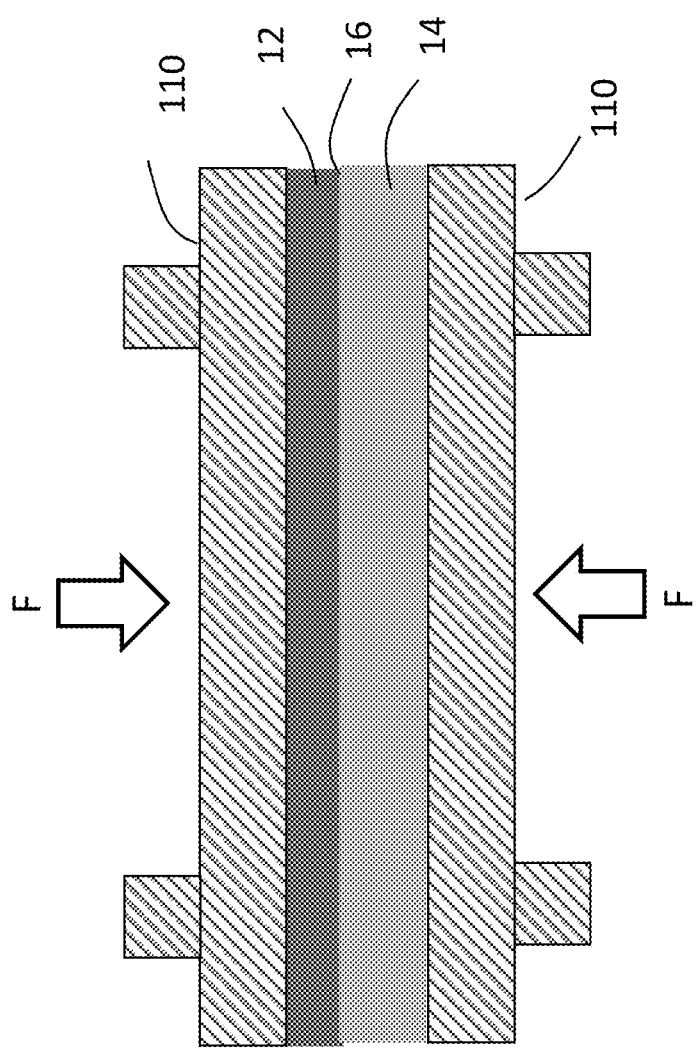
FIG. 3 illustrates a hot-pressing process of producing a two-layer polymer-metal hybrid component that is bonded by C—O-M bonds.

In some embodiments, the hot-pressing methods can be used to produce a polymer-metal hybrid component that comprises a layer of metal 12 and a layer of polymer 14 that are bonded by C—O-M bonds 16 (FIG. 3).

Figure 4:
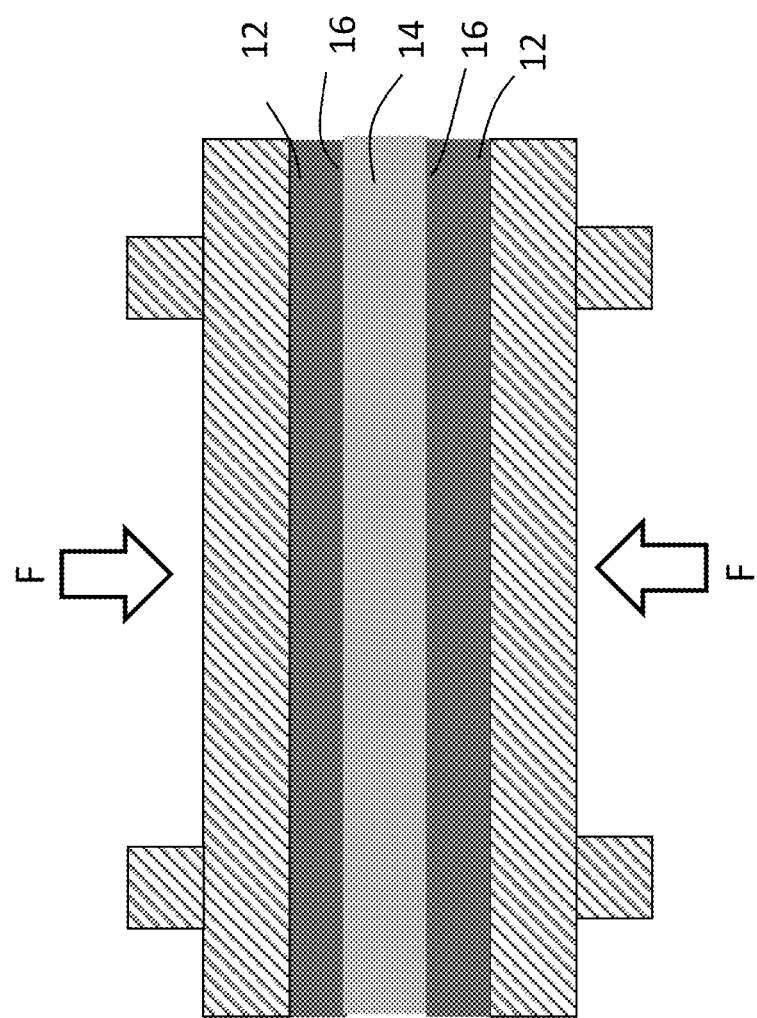
FIG. 4 illustrates a hot-pressing process of producing a multiple layer polymer-metal hybrid component that is bonded by C—O-M bonds.

In some embodiments, the hot-pressing methods can be used to produce a polymer-metal hybrid component that comprises multiple layers of metal 12, 12' and polymer 14 that are bonded by C—O-M bonds 16 (FIG. 4). It should be understood that the metal layers 12, 12' can be similar or dissimilar metals.

Figure 5:
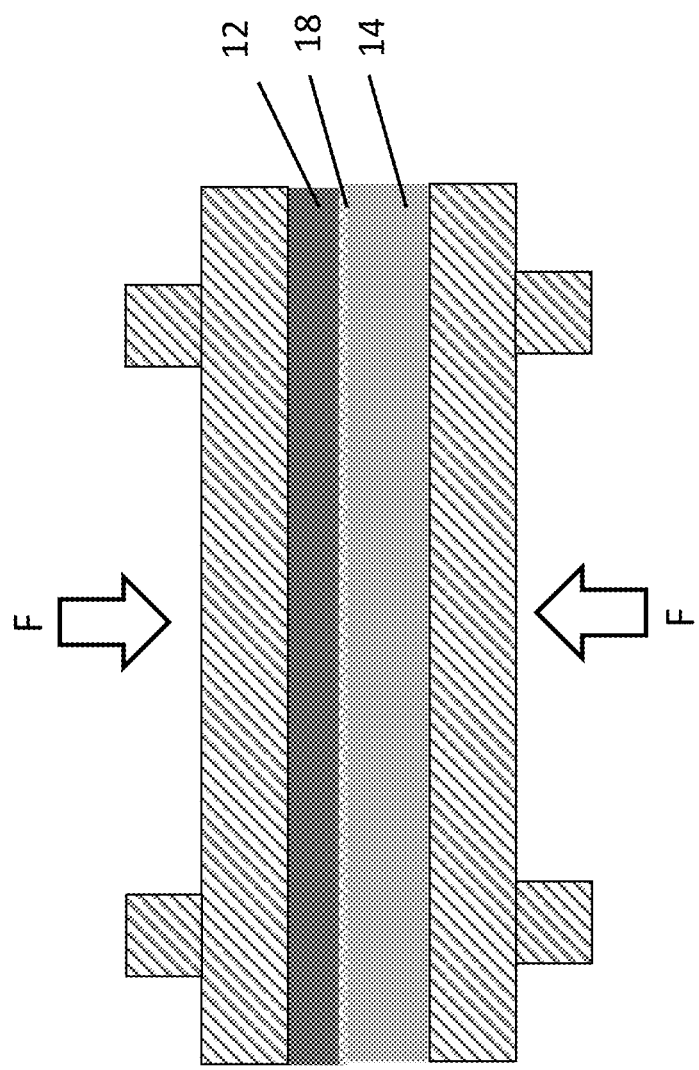
FIG. 5 illustrates a hot-pressing process of producing a two-layer polymer-metal hybrid component that is bonded by 3D C—O-M bonds.

In some embodiments, the hot-pressing methods can be used to produce a polymer-metal hybrid component that comprises a metal and a polymer that are bonded by 3D C—O-M bonds (FIG. 5). A layer of distributed air pockets 18 (such as porous metals, metal mesh, and enhanced 3d metal surface textures) or a polymer containing functional groups can be added at the interface 16 of metal 12 and polymer surface 14 for generating the C—O-M bonds.

Figure 6:
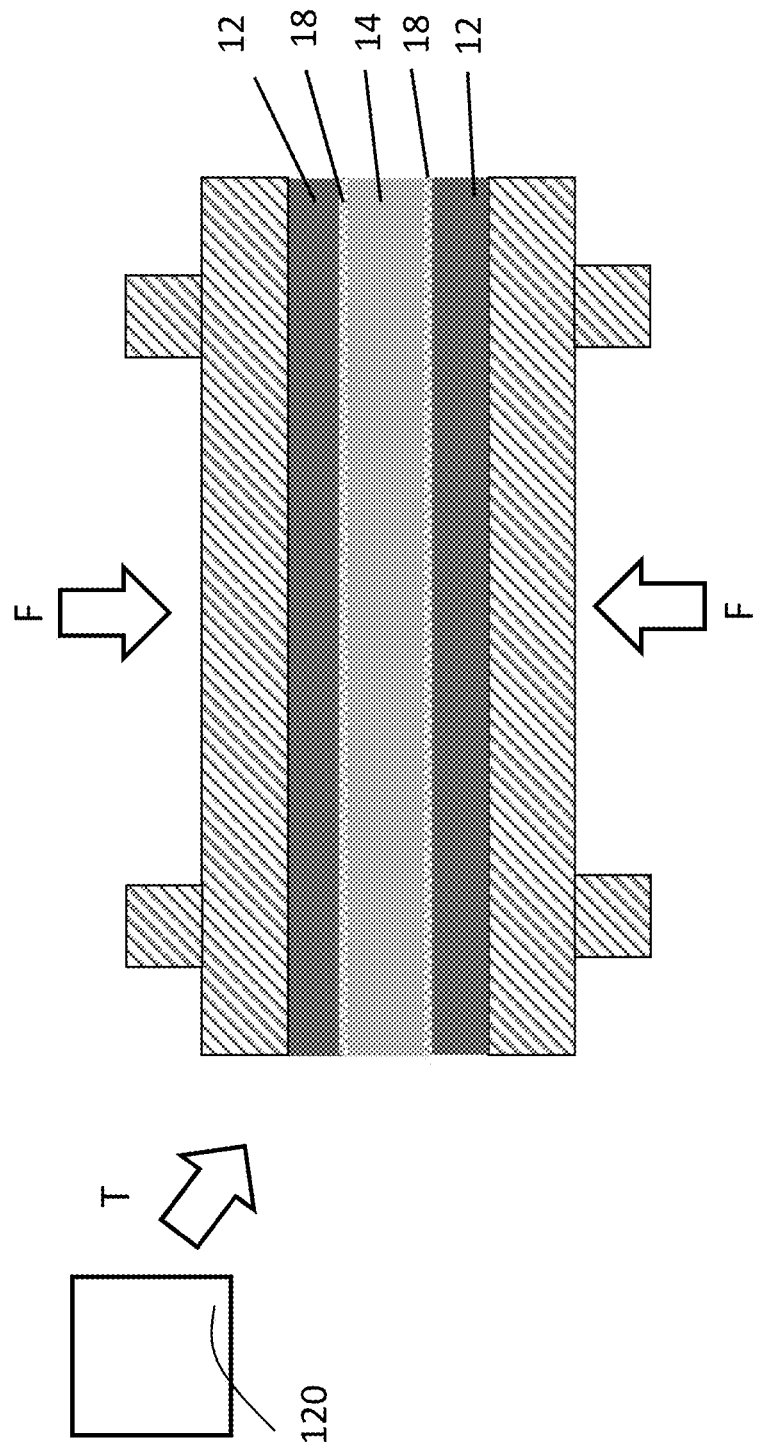
FIG. 6 illustrates a hot-pressing process of producing a multiple layer polymer-metal hybrid component that is bonded by 3D C—O-M bonds.

In some embodiments, the hot-pressing methods can be used to produce a polymer-metal hybrid component that comprises multiple layers of metal and polymer that are bonded by C—O-M bonds (FIG. 6). Distributed air pockets 18 (such as porous metals, metal mesh, and enhanced 3d metal surface textures) or polymer containing functional groups can be added at the interface 16 of metal 12 and polymer surface 14 for generating the C—O-M bonds.

In some embodiments, the polymer 14 and metal 12 to be bonded by C—O-M bonds have complex shapes.

In some embodiments, the metal 12 is heated in an oven to temperature higher than the glass transition temperature of the polymer 14 and less than a metal melting temperature of the metal 12 before the overlapping of metal 12 and polymer 14.

In some embodiments, the metal 12 is heated by an additional heating system 120 to temperature higher than the glass transition temperature of the polymer 14 and less than a flash ignition temperature of the polymer 14 and less than a metal melting temperature of the metal 12 after the overlapping of metal 12 and polymer 14.

In some embodiments, the metal 12 is heated by an additional heating system 120 to temperature higher than the glass transition temperature of the polymer 14 and less than a flash ignition temperature of the polymer 14 and less than a metal melting temperature of the metal 12 after application of the compressive pressure.

In some embodiments, the heating and compressive pressure are achieved or applied by a unitary system. The metal is heated to temperature higher than the glass transition temperature of the polymer and less than a flash ignition temperature of the polymer and less than a metal melting temperature of the metal.

In some embodiments, distributed air pockets 18 are formed along at least part of the interface 16 between the metal 12 and the polymer 14.

In some embodiments, the distributed air pockets 18 is produced through capturing a porous structure on a surface of the metal 12.

In some embodiments, the distributed air pockets 18 is produced through welding a layer of porous structure on a surface of the metal 12.

In some embodiments, the distributed air pockets 18 is produced through welding a metal mesh to a surface of the metal 12.

In some embodiments, the distributed air pockets 18 is achieved in-situ through producing three-dimensional surface features, grooves, or protrusions on a surface of the metal 12.

In some embodiments, the three-dimensional surface features, grooves, or protrusions on the metal surface can be produce using an appropriate mechanical engraving, energy beam, chemical agent, and/or electrical discharge system. In some embodiments, the depth or height of the air pockets 18 can be greater than 10 microns.

According to some embodiments of the present teachings, a hot-rolling process of producing polymer-metal hybrid components that are bonded by C—O-M bonds at the interface comprises the following steps:

Step 1: optionally overlapping at least one of the metal and the polymer containing carbonyl groups (C=O) together;

Step 2: rolling the overlapped metal and polymer after or during the time the interfacial temperature is above a glass transition temperature of the polymer and less than a flash ignition temperature of the polymer and less than a metal melting temperature of the metal;

Step 3: generating compressive pressure higher than the flow resistance of the softened polymer at the interface to generate intimate atomic contact between the metal and the polymer to create substantially C—O-M chemical bonds along the joint interface, the C—O-M chemical bonds being formed from carbonyl groups (C=O) within the polymer; and Step 4: reducing the interfacial temperature below the polymer melting temperature before 5% of the polymer has pyrolyzed to avoid serious breaking of the C—O-M chemical bonds According to some embodiments of the present teachings, a hot-rolling process of producing polymer-metal hybrid components that are bonded by C—O-M bonds at the interface comprises the following steps:

Step 1: forming distributed air pockets or adding polymer containing functional groups at the interface between the metal and polymer to be bonded.

Step 2: rolling the overlapped metal and polymer after or during the time that the interfacial temperature is above a glass transition temperature of the polymer and less than a flash ignition temperature of the polymer and less than a metal melting temperature of the metal;

Step 3: generating compressive pressure the softened polymer at the interface to generate intimate atomic contact between the metal and the polymer to create substantially C—O-M chemical bonds along the joint interface; and.

Step 4: reducing the interfacial temperature below the polymer melting temperature before 5% of the polymer has pyrolyzed to avoid serious breaking of the C—O-M chemical bonds.

Figure 7:
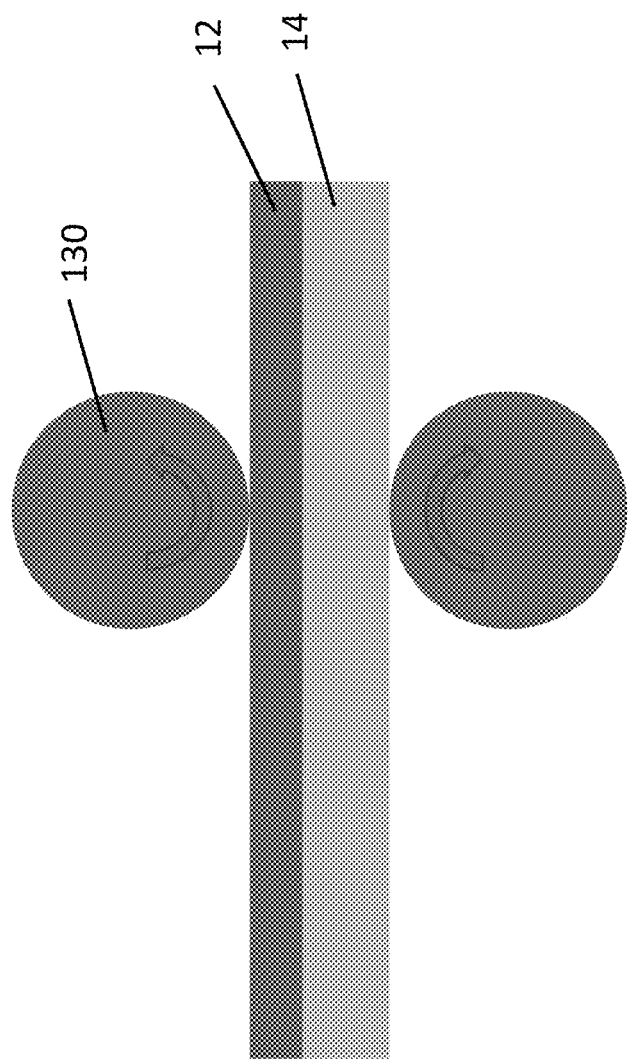
FIG. 7 illustrates a hot-rolling process of producing a two-layer polymer-metal hybrid component that is bonded by C—O-M bonds.

In some embodiments, the hot-rolling methods can be used to produce a polymer-metal hybrid component that comprises a layer of metal 12 and a layer of polymer 14 that are bonded by C—O-M bonds via a rolling application system 130 (FIG. 7).

Figure 8:
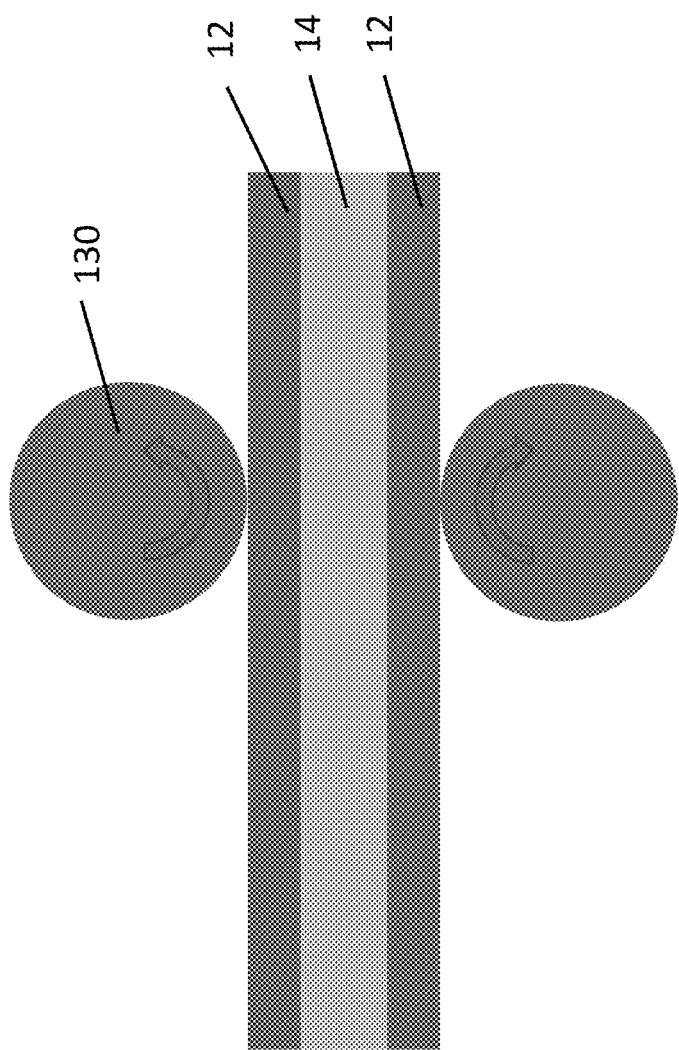
FIG. 8 illustrates a hot-rolling process of producing a multiple layer polymer-metal hybrid component that is bonded by C—O-M bonds.

In some embodiments, the hot-rolling methods can be used to produce a polymer-metal hybrid component that comprises multiple layers of metal 12, 12' and polymer 14 that are bonded by C—O-M bonds (FIG. 8).

Figure 9:
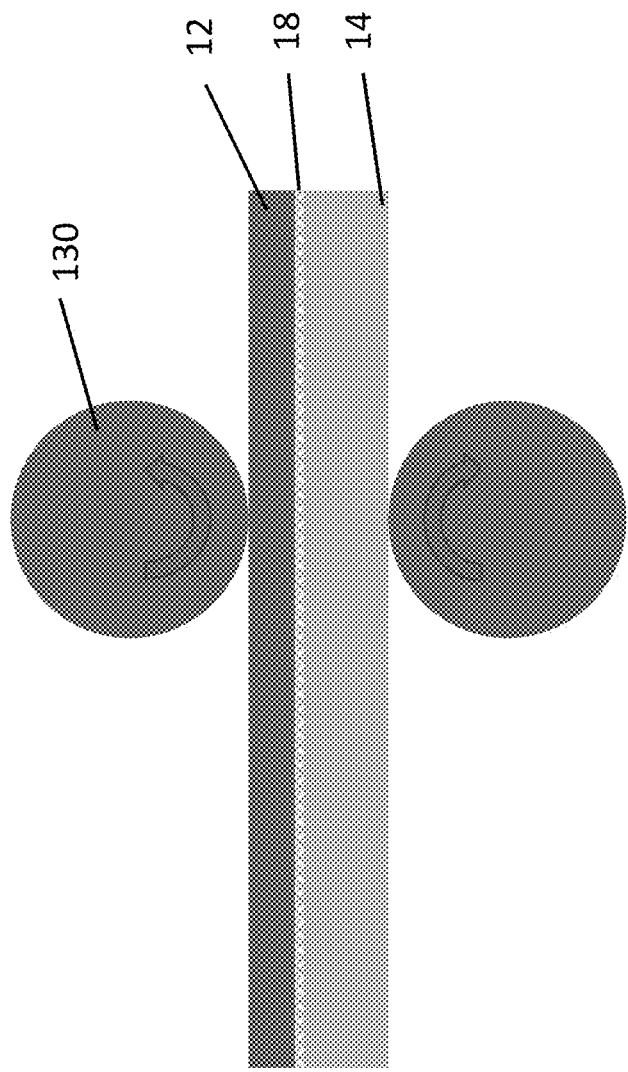
FIG. 9 illustrates a hot-rolling process of producing a two-layer polymer-metal hybrid component that is bonded by 3D C—O-M bonds.

In some embodiments, the hot-rolling methods can be used to produce a polymer-metal hybrid component that comprises a layer of metal and a layer of polymer that are bonded by C—O-M bonds (FIG. 9). A layer of distributed air pockets (such as porous metals, metal mesh, and enhanced 3d metal surface textures) or a polymer containing functional groups can be added at the interface of metal and polymer surface for generating the C—O-M bonds.

Figure 10:
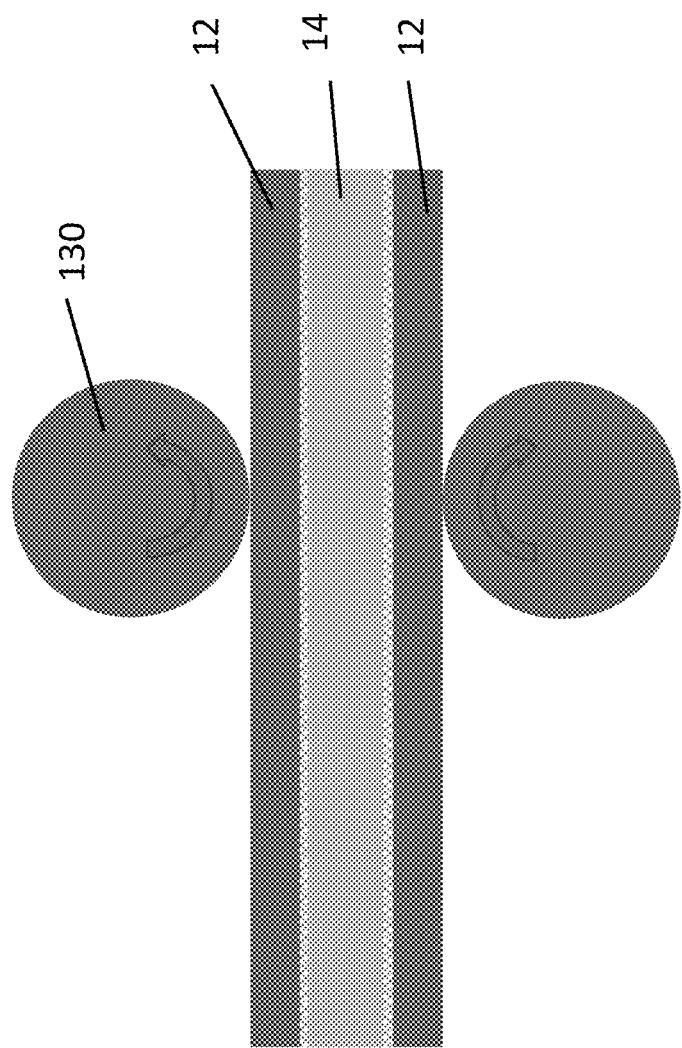
FIG. 10 illustrates a hot-rolling process of producing a multiple layer polymer-metal hybrid component that is bonded by 3D C—O-M bonds.

In some embodiments, the hot-pressing methods can be used to produce a polymer-metal hybrid component that comprises multiple layers of metal and polymer that are bonded by 3D C—O-M bonds (FIG. 10). Distributed air pockets 18 (such as porous metals, metal mesh, and enhanced 3d metal surface textures) can be added at the interface of metal 12 and polymer 14 surface for generating the 3D C—O-M bonds.

Figure 11:
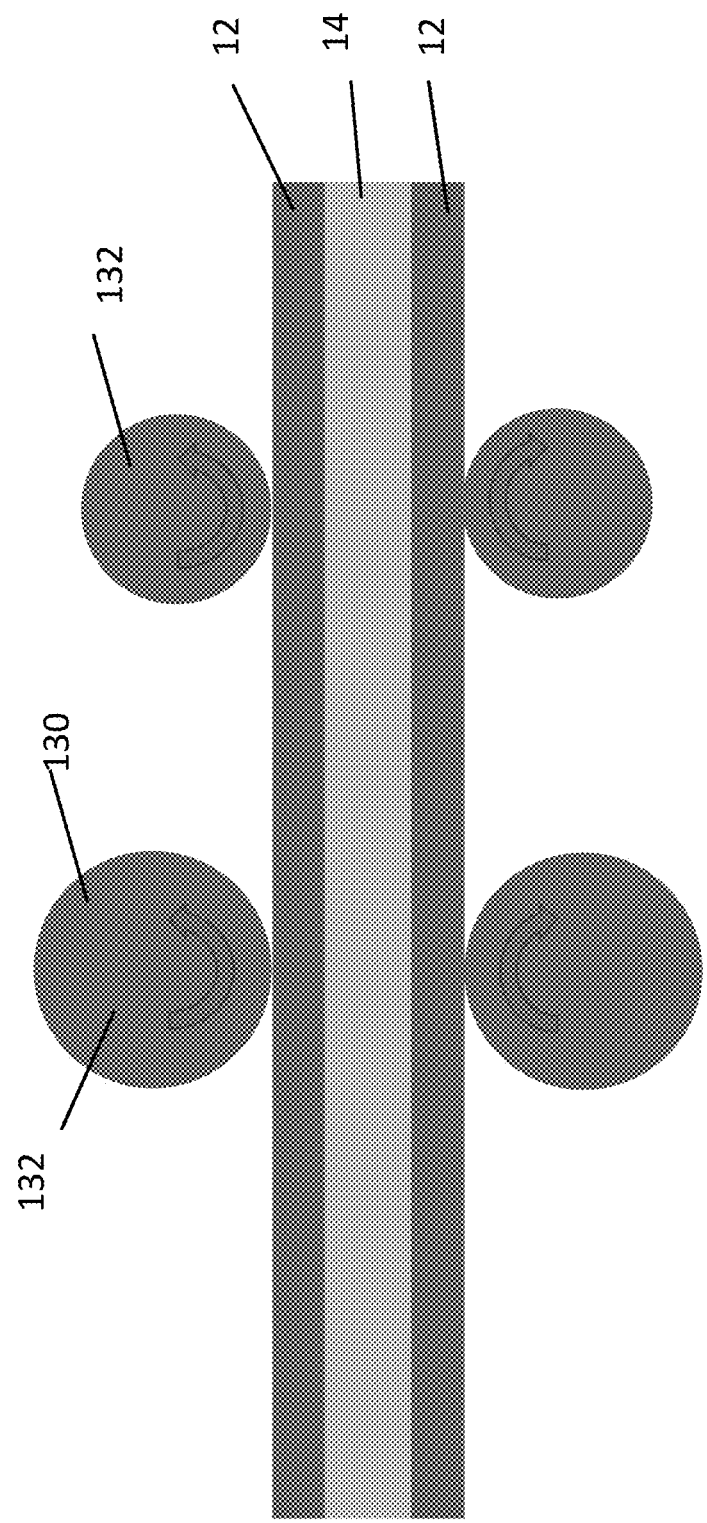
FIG. 11 illustrates a hot-rolling process of producing a polymer-metal hybrid component that is bonded by C—O-M bonds using multiple rolling mills.

In some embodiments, the rolling system 130 includes multiple rolling mills 132 (FIG. 11).

Figure 12:
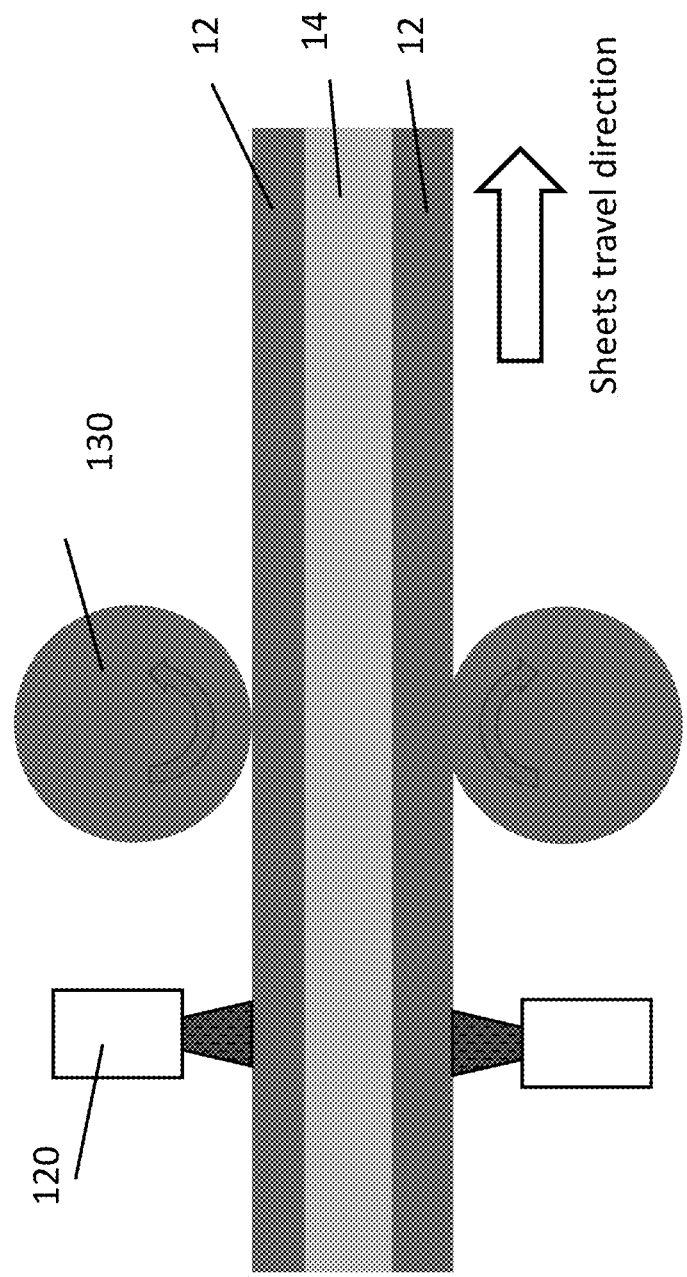
FIG. 12 illustrates a hot-rolling process of producing a polymer-metal hybrid component that is bonded by C—O-M bonds with an assistance of an additional pre-heating system.

In some embodiments, an additional heating system 120 is applied during the rolling process (FIG. 12). Heating system 120 can comprise a heating gun, flames, induction heater, convective heater, radiative heater, oven, or other heating system.

Figure 13:
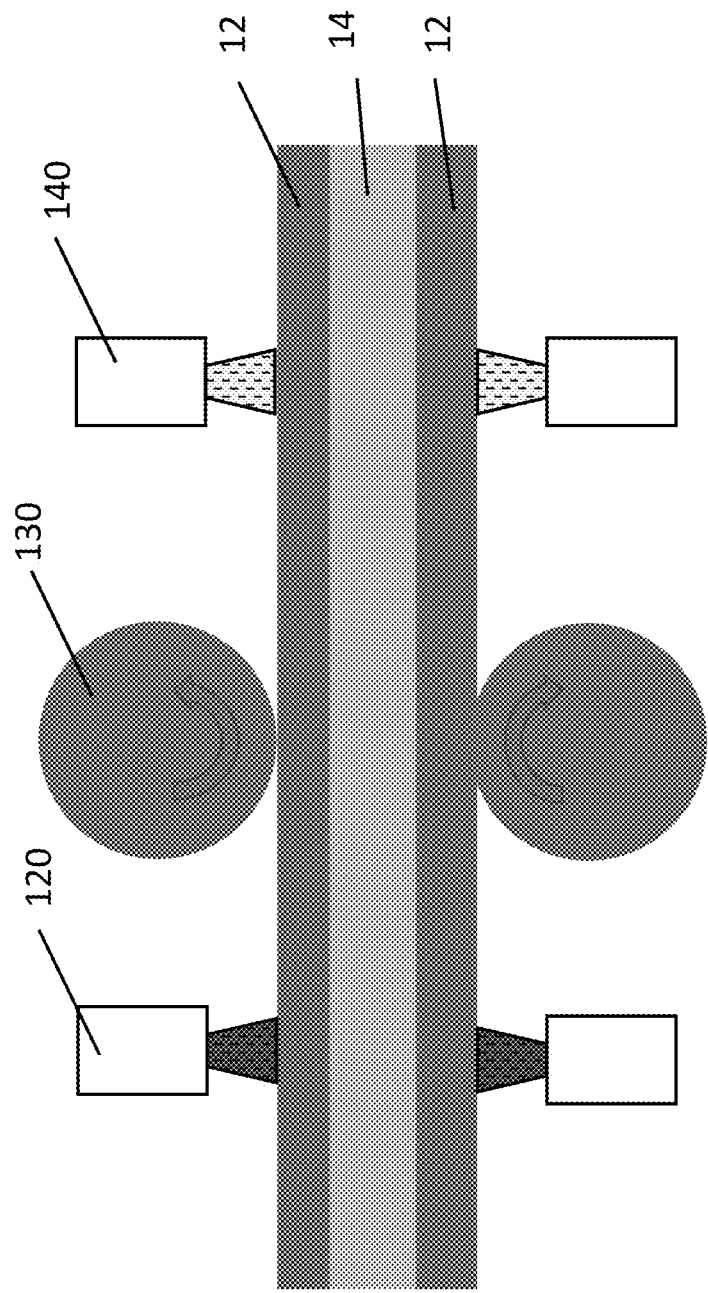
FIG. 13 illustrates a hot-rolling process of producing a polymer-metal hybrid component that is bonded by C—O-M bonds with an assistance of an additional pre-heating system and an additional cooling system.

In some embodiments, an additional heating system 120 and an additional cooling system 140 is applied during the rolling process (FIG. 13). Cooling system 140 can comprise a cold air system, a cold water system, or other cooling system.

In some embodiments, the metal is heated in an oven to a temperature higher than the glass transition temperature of the polymer and less than a metal melting temperature of the metal before the overlapping of metal and polymer.

In some embodiments, the metal is heated by an additional heating system 120 to a temperature higher than the glass transition temperature of the polymer and less than a flash ignition temperature of the polymer and less than a metal melting temperature of the metal before the rolling.

In some embodiments, the heating and compressive pressure are achieved together by the rolling system 130. The metal is heated to a temperature higher than the glass transition temperature of the polymer and less than a flash ignition temperature of the polymer and less than a metal melting temperature of the metal.

In some embodiments, distributed air pockets are formed along at least part of the interface 16 between the metal and the polymer.

In some embodiments, the distributed air pockets 18 are produced through capturing a porous structure on metal surface.

In some embodiments, the distributed air pockets 18 are produced through welding a layer of porous structure on metal surface.

In some embodiments, the distributed air pockets 18 are produced through welding a metal mesh to a metal surface.

In some embodiments, the distributed air pockets 18 are achieved in-situ through producing three-dimensional surface features, grooves, or protrusions on a surface of the metal. In some embodiments, the three-dimensional surface features, grooves, or protrusions on a metal surface can be produce using an appropriate mechanical engraving, energy beam, chemical agent, and/or electrical discharge system. In some embodiments, the depth or height of the air pockets can be greater than 10 microns.

Figure 14:
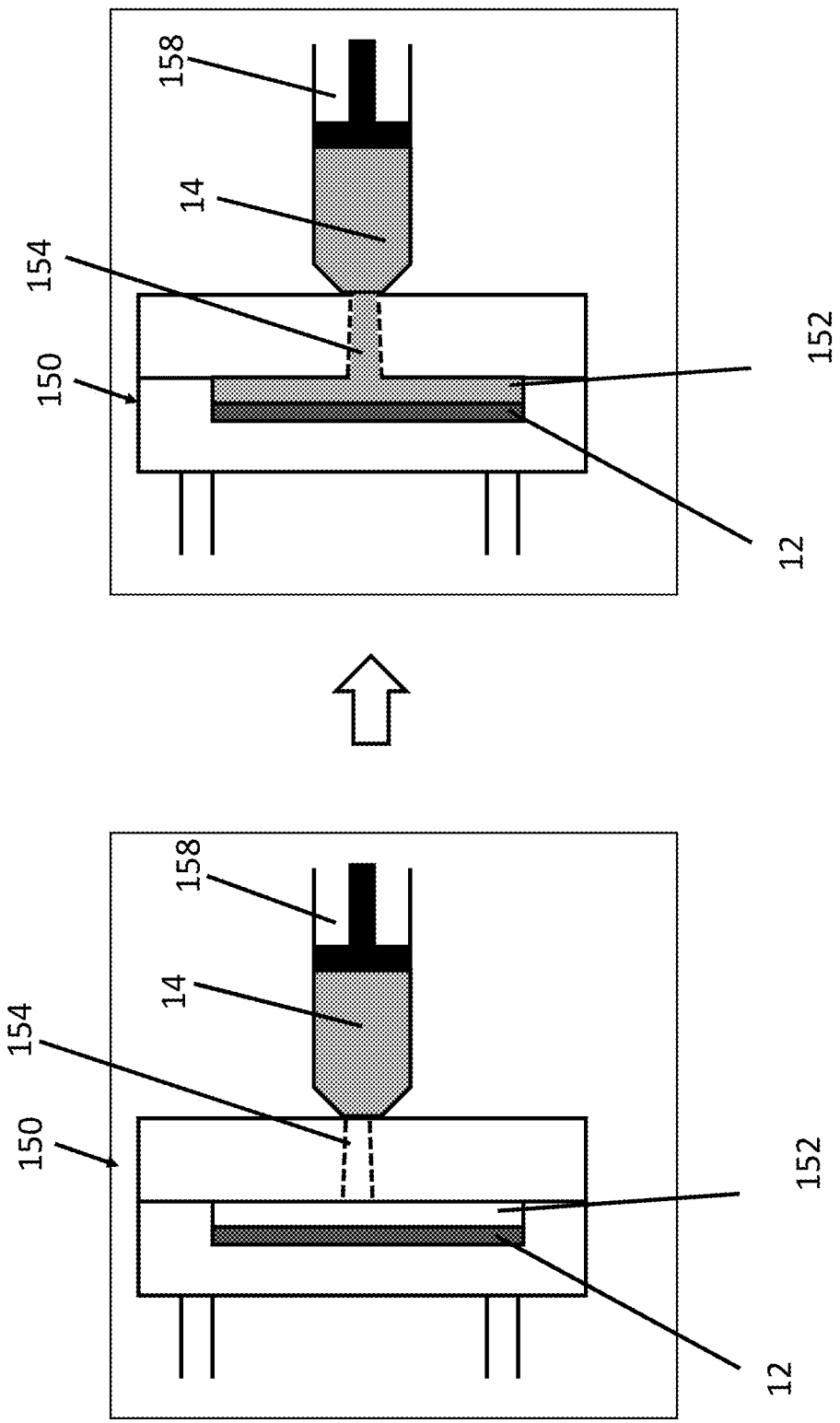
FIG. 14 illustrates an injection molding process of producing a polymer-metal hybrid component that is bonded by C—O-M bonds.

According to some embodiments of current teaching, an injection molding method of producing polymer-metal hybrid components that are bonded by C—O-M bonds at the interface comprises the following steps (FIG. 14).

Step 1: placing at least one metal components within a mold,

Step 2: injecting liquid-like polymer containing carbonyl groups (C=O) into the mold containing at least one metal components.

Step 3: maintaining the polymer metal interfacial temperature higher than the glass transition temperature of the polymer and maintaining the compressive pressure at the polymer metal interface higher than the flow resistance of the softened polymer to generate intimate atomic contact between the metal and the polymer to create substantially C—O-M chemical bonds along the joint interface, the C—O-M chemical bonds being formed from carbonyl groups (C=O) within the polymer.

Step 4: reducing the interfacial temperature below the polymer melting temperature before 5% of the polymer has pyrolyzed to avoid serious breaking of the C—O-M chemical bonds.

As illustrated in FIG. 14, the injection molding can be achieved with an injection molding system 150 having a mold having an enclosed volume 152 for receiving the metal 12, a nozzle 154 for receiving a liquid-like polymer 14, and a drive system 156, such as a piston 158, for injecting the polymer 14.

Figure 15:
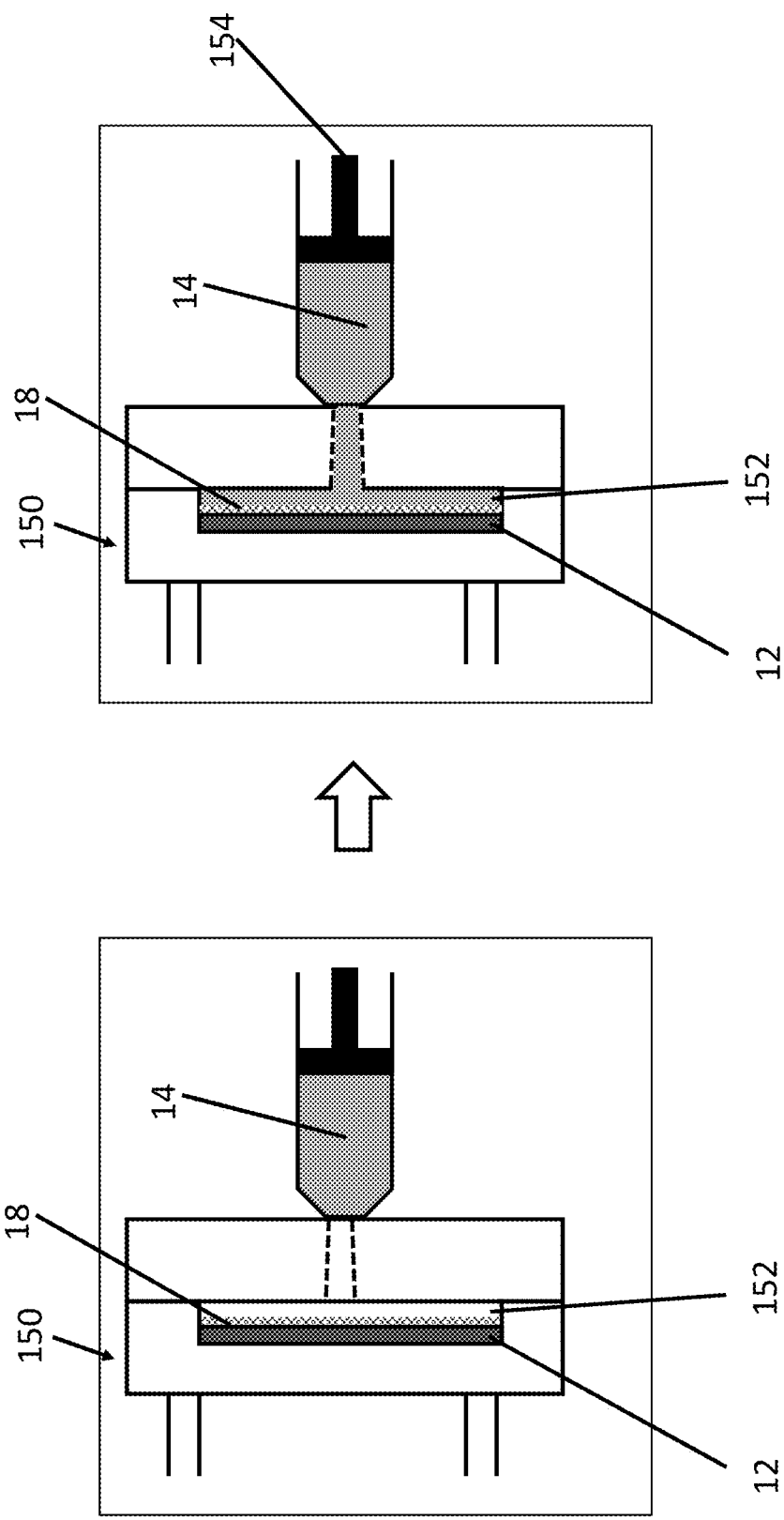
FIG. 15 illustrates an injection molding process of producing a two-layer polymer-metal hybrid component that is bonded by 3D C—O-M bonds.

According to the principle of current teaching, an injection molding method of producing polymer-metal hybrid components that are bonded by three-dimensional distributed C—O-M bonds at the interface comprises the following steps in some embodiment (FIG. 15):

Step 1: placing at least one metal components with a surface containing distributed air pockets or a polymer containing functional groups within a mold;

Step 2: injecting liquid-like polymer into the mold containing at least one metal components with at least one distributed air pockets surface or a polymer containing functional groups;

Step 3: maintaining the polymer metal interfacial temperature higher than the glass transition temperature of the polymer and maintaining the compressive pressure at the polymer metal interface higher than the flow resistance of the softened polymer to generate intimate atomic contact between the metal and the polymer to create substantially C—O-M chemical bonds along the joint interface, the C—O-M chemical bond being formed from new functional groups created by the reaction of polymer surface and the trapped air within the distributed air pockets.

Step 4: reducing the interfacial temperature below the polymer melting temperature before 5% of the polymer has pyrolyzed to avoid serious breaking of the C—O-M chemical bonds.

In some embodiments, the metal is heated in an oven to temperature higher than the glass transition temperature of the polymer and less than a flash ignition temperature of the polymer and less than a metal melting temperature of the metal before placing it in the mold.

In some embodiments, the metal is heated by an additional heating system to temperature higher than the glass transition temperature of the polymer and less than a flash ignition temperature of the polymer and less than a metal melting temperature of the metal after it is placed it in the mold.

In some embodiments, the metal is heated directly by the hot liquid like polymer to temperature higher than the glass transition temperature of the polymer and less than a flash ignition temperature of the polymer and less than a metal melting temperature of the metal.

In some embodiments, the metal placed within the mold can be a metal part having a complex shape.

In some embodiments, the metal placed within the mold can be a metal sheet.

In some embodiments, distributed air pockets are formed on metal surface before it is placed in the mold.

In some embodiments, distributed air pockets are formed on metal surface after it is placed in the mold.

In some embodiments, distributed air pockets are formed at least part of the interface between the metal and the polymer.

In some embodiments, the distributed air pockets 18 is produced through capturing a porous structure on metal surface.

In some embodiments, the distributed air pockets 18 is produced through welding a layer of porous structure on metal surface.

In some embodiments, the distributed air pockets 18 is produced through welding a metal mesh to a metal surface.

In some embodiments, the distributed air pockets 18 is achieved through in-situ producing three-dimensional surface features, grooves, or protrusions on a surface of the metal.

In some embodiments, the three-dimensional surface features, grooves, or protrusions on a metal surface can be produce using an appropriate mechanical engraving, energy beam, chemical agent, and/or electrical discharge system. In some embodiments, the depth or height of the air pockets can be greater than 10 microns.

Figure 16:
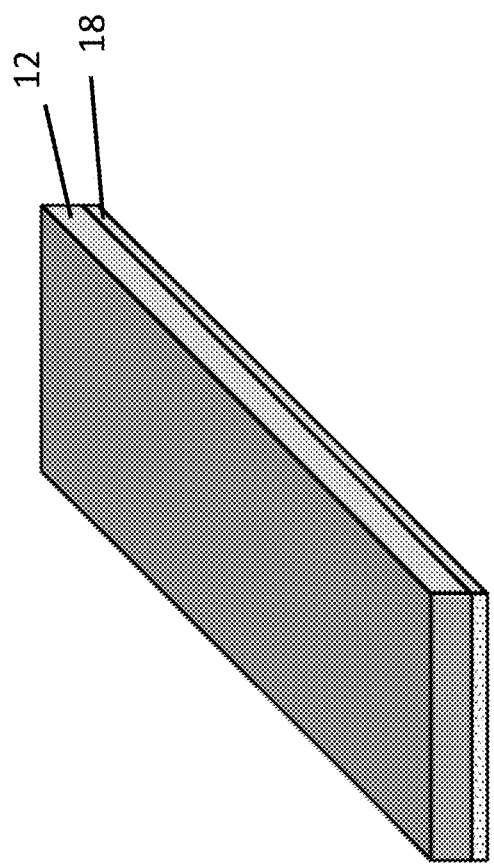
FIG. 16 illustrates welding a piece of porous metal or depressively distributed metal wires on a metal sheet.

In some embodiments, the distributed air pockets 18 on metal surface is produced through welding a layer of porous structure (such as metal mesh) on metal surface using resistant wedding (FIG. 16).

Figure 17:
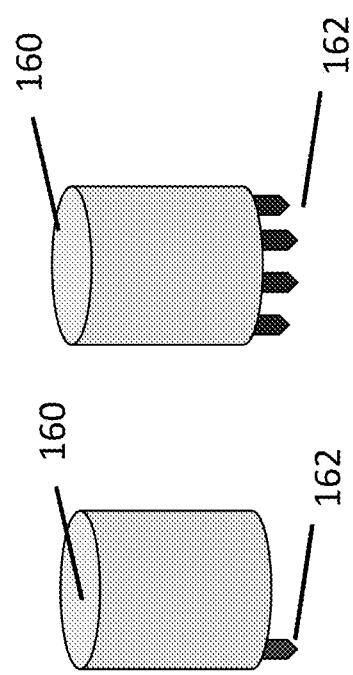
FIG. 17 illustrates scratch tools with one or multiple scribe tips.
Figure 18:
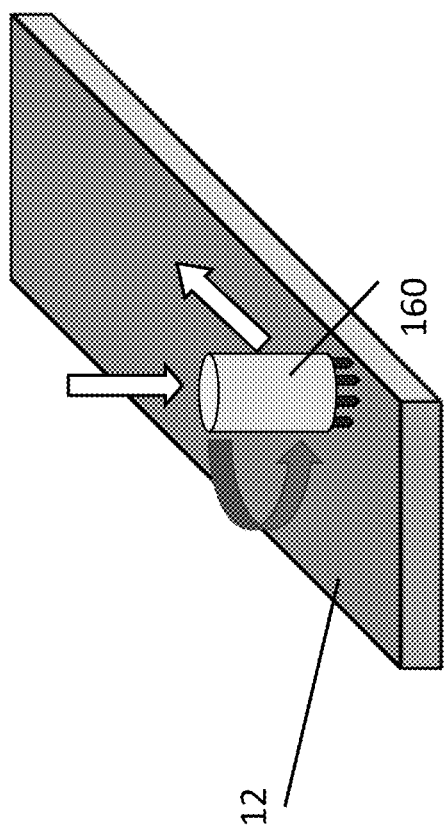
FIG. 18 illustrates producing deep grooves on a metal surface using a rotating and traversing scratch tool.
Figure 19:
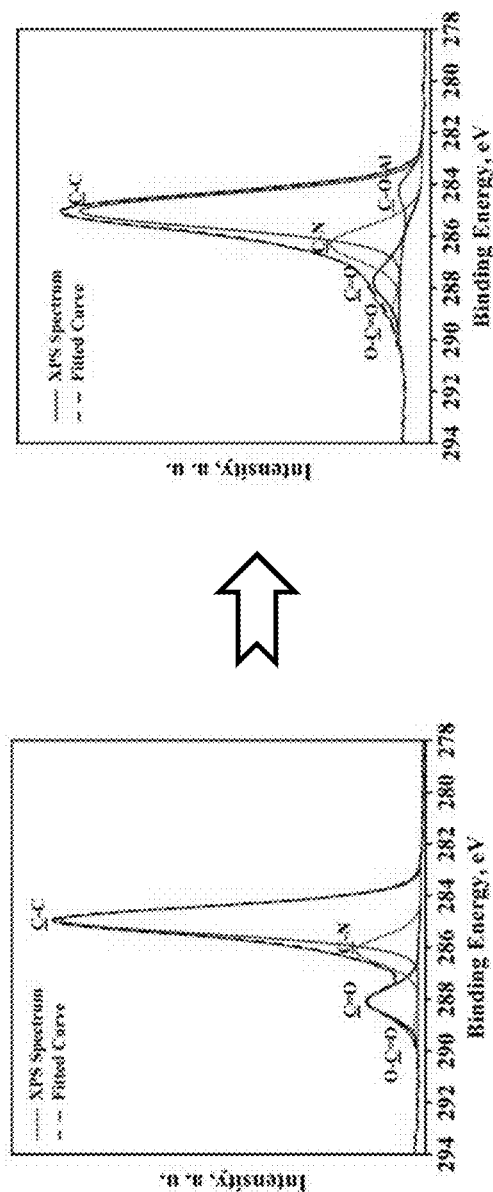
FIG. 19 shows evidence of XPS examination result of the transition of carbonyl groups (C=O) into C—O-M bonds at a bonding interface of a polymer-metal hybrid component.

In some embodiments, scratch tools 160 with one or multiple scribe tips 162 are provided to produce distributed air pockets through scratching deep grooves that can trap sufficient air at the polymer-metal interface (FIG. 17). The scratch tool is driven to rotate and travel along the aluminum sheet surface. The plunge depth of the scribe tips is 0.2-0.5 mm. Dispersively distributed deep grooves are made on the metal surface (FIG. 18).

In some embodiments, XPS examination is used to characterize the as-received polymer surface and the polymer-metal bonding interface of a polymer-metal hybrid structure showing that the transition from carbonyl groups (C=O) into C—O-M bonds occurred during polymer-metal hybrid structure fabrication described in the present teaching.

The present teachings are particularly applicable to all the thermoplastic-based polymer or polymer composites.

The fabrication process is cost-effective and high speed.

Suitable for high volume production.

No adhesive needs to be used.

Suitable for automation and robotic applications.

A possible variation includes additional metal surface modification methods, new temperature and compression application mechanism may be developed in the future.

In some embodiments, a method of producing polymer-metal hybrid components that are bonded by C—O-M bonds at a joint interface, where M represents an element in the metal to be joined, is provided. The method comprises:

providing the metal and the polymer containing carbonyl groups (C=O);

applying compressive pressure to a joint interface of the metal and the polymer, the applied compressive pressure being higher than a flow resistance of the softened polymer at the joint interface;

heating the joint interface to an interfacial temperature above a glass transition temperature of the polymer and maintaining the compressive pressure at the joint interface to generate intimate atomic contact between the metal and the polymer to create substantially C—O-M chemical bonds along the joint interface; and reducing the interfacial temperature below the polymer melting temperature before 5% of the polymer has pyrolyzed to avoid breaking of the C—O-M chemical bonds.

In some embodiments, the method further comprises forming distributed air pockets on at least one surface of the metal prior to the step of applying compressive pressure to the joint interface. In some embodiments, the step of forming distributed air pockets comprises capturing a porous structure on the metal. In some embodiments, the step of forming distributed air pockets comprises forming three-dimensional surface features, grooves, or protrusions on a surface of the metal. In some embodiments, the C—O-M chemical bond are formed from new functional groups created by the reaction of polymer and air trapped within the distributed air pockets. In some embodiments, the step of providing the metal and the polymer comprises overlapping the metal and the polymer.

In some embodiments, the method further comprises rolling the overlapped metal and polymer during the step of maintaining the interfacial temperature above the glass transition temperature of the polymer.

In some embodiments, the step of providing the metal and the polymer comprises overlapping the metal and the polymer. In some embodiments, the method further comprises rolling the overlapped metal and polymer during the step of maintaining the interfacial temperature above the glass transition temperature of the polymer. In some embodiments, the step of heating the joint interface to an interfacial temperature is performed before the step of rolling. In some embodiments, the step of heating the joint interface to an interfacial temperature and the step of rolling are performed simultaneously.

In some embodiments, the step of providing the metal and the polymer comprises positioning the metal in a mold and injecting polymer into the mold. In some embodiments, the step of heating the joint interface is performed by heating the polymer and injecting polymer into the mold.

In some embodiments, the metal comprises distributed air pockets along at least a portion of a surface thereof. In some embodiments, the C—O-M chemical bond are formed from new functional groups created by the reaction of polymer and air trapped within the distributed air pockets. In some embodiments, the C—O-M chemical bonds are formed from carbonyl groups (C=O) within the polymer. In some embodiments, the C—O-M chemical bonds are three-dimensionally distributed along the joint interface.

In some embodiments, the step of applying compressive pressure and the step of heating the joint interface to the interfacial temperature are achieved using discrete systems.

In some embodiments, the step of applying compressive pressure and the step of heating the joint interface to the interfacial temperature are achieved using a unitary system.

In some embodiments, the step of heating the joint interface to the interfacial temperature above the glass transition temperature of the polymer comprises heating the joint interface to the interfacial temperature above the glass transition temperature of the polymer and below a flash ignition temperature of the polymer and below a metal melting temperature of the metal.

SUMMARY

The current teaching describes methods of producing polymer-metal hybrid components that are bonded by C—O-M bonds at the interface using at least one of the hot pressing, rolling, and injection molding methods to create the chemical bond formation conditions at the polymer and metal interface. When the thermal cycle and compressive pressure specified in this teaching is combinationally created at the polymer and metal interfaced, strong C—O-M bonds forms at the interface and strongly bonded the metal and polymer together through the reaction carbonyl group (C=O) in polymer and the metal surface. For polymers lacking enough carbonyl groups, new functional groups can be in-situ generation through introducing distributed air pockets at the polymer metal interface for forming 3-dimensional distributed C—O-M bonds at the interface.

The foregoing description of the embodiments has been provided for purposes of illustration and description. It is not intended to be exhaustive or to limit the disclosure. Individual elements or features of a particular embodiment are generally not limited to that particular embodiments, but, where applicable, are interchangeable and can be used in a selected embodiments, even if not specifically shown or described. The same may also be varied in many ways. Such variations are not to be regarded as a departure from the disclosure, and all such modifications are intended to be included within the scope of the disclosure.

What is claimed is:

1. A method of producing polymer-metal hybrid components that are bonded by C—O-M bonds at a polymer-metal interface, where M represents an element in the metal to be joined, the method comprising:
    providing the metal and the polymer;
    forming distributed air pockets on at least one surface of the metal using a scratching tool with multiple scribe tips to produce distributed scratching grooves 0.2-0.5 mm in depth on the at least one surface of the metal that traps air at the polymer metal interface, the scratching tool is driven to rotate and travel along the at least one surface;
    applying compressive pressure to a polymer-metal interface after the step of forming distributed air pockets on at least one surface of the metal, the applied compressive pressure being higher than a flow resistance of the softened polymer at the polymer-metal interface;
    heating the polymer-metal interface to an interfacial temperature above a glass transition temperature of the polymer and maintaining the compressive pressure at the polymer-metal interface to generate intimate atomic contact between the metal and the polymer to create substantially C—O-M chemical bonds along the polymer-metal interface; and
    reducing the interfacial temperature below the polymer melting temperature before 5% of the polymer has pyrolyzed to avoid breaking of the C—O-M chemical bonds.

2. The method according to claim 1, wherein the step of providing the metal and the polymer comprises overlapping the metal and the polymer, and the method further comprises rolling the overlapped metal and polymer during the step of maintaining the interfacial temperature above the glass transition temperature of the polymer.

3. The method according to claim 1, wherein the step of providing the metal and the polymer comprising overlapping the metal and the polymer.

4. The method according to claim 3 further comprising rolling the overlapped metal and polymer during the step of maintaining the interfacial temperature above the glass transition temperature of the polymer.

5. The method according to claim 4, wherein the step of heating the polymer-metal interface to an interfacial temperature is performed before the step of rolling.

6. The method according to claim 4, wherein the step of heating the polymer-metal interface to an interfacial temperature and the step of rolling are performed simultaneously.

7. The method according to claim 1, wherein the step of providing the metal and the polymer comprising positioning the metal in a mold and injecting polymer into the mold.

8. The method according to claim 7, wherein the step of heating the polymer-metal interface is performed by heating the polymer and injecting polymer into the mold.

9. The method according to claim 7, wherein the metal comprises distributed air pockets along at least a portion of a surface thereof.

10. The method according to claim 9 wherein the C—O-M chemical bond are formed from new functional groups created by the reaction of polymer and air trapped within the distributed air pockets.

11. The method according to claim 1 wherein the polymer contains functional groups and is applied on a surface of the metal prior to the step of applying compressive pressure to the polymer-metal interface.

12. The method according to claim 1 wherein the C—O-M chemical bonds are formed from carbonyl groups (C=O) within the polymer.

13. The method according to claim 1 wherein the C—O-M chemical bonds are three-dimensionally distributed along the polymer-metal interface.

14. The method according to claim 1, wherein the step of applying compressive pressure and the step of heating the polymer-metal interface to the interfacial temperature are achieved using discrete systems.

15. The method according to claim 1, wherein the step of applying compressive pressure and the step of heating the polymer-metal interface to the interfacial temperature are achieved using a unitary system.

16. The method according to claim 1, wherein the step of heating the polymer-metal interface to the interfacial temperature above the glass transition temperature of the polymer comprises heating the polymer-metal interface to the interfacial temperature above the glass transition temperature of the polymer and below a flash ignition temperature of the polymer and below a metal melting temperature of the metal.

* * * * *

UNITED STATES PATENT AND TRADEMARK OFFICE
CERTIFICATE OF CORRECTION

PATENT NO. : 11,890,788 B2
APPLICATION NO. : 17/323647
DATED : February 6, 2024
INVENTOR(S) : Fengchao Liu et al.

It is certified that error appears in the above-identified patent and that said Letters Patent is hereby corrected as shown below:

On the Title Page

At page 2, Column 2, Item (56), foreign patent documents, delete "6353931" and insert -- 5353931 --.

Signed and Sealed this
Sixteenth Day of July, 2024

Katherine Kelly Vidal
*Director of the United States Patent and Trademark Office*